(12) United States Patent
Kocher et al.

(10) Patent No.: US 10,990,700 B1
(45) Date of Patent: Apr. 27, 2021

(54) INTERNET PROFILE DILUTION DEVICE (IPDD)

(71) Applicants: Robert William Kocher, McLean, VA (US); Douglas Earl Dyer, Herndon, VA (US); Andrew Christopher Isett, Washington, DC (US)

(72) Inventors: Robert William Kocher, McLean, VA (US); Douglas Earl Dyer, Herndon, VA (US); Andrew Christopher Isett, Washington, DC (US)

(*) Notice: Subject to any disclaimer, the term of this patent is extended or adjusted under 35 U.S.C. 154(b) by 0 days.

(21) Appl. No.: 16/793,806

(22) Filed: Feb. 18, 2020

(51) Int. Cl.
| | |
|---|---|
| *G06F 21/62* | (2013.01) |
| *G06Q 30/02* | (2012.01) |
| *G06F 16/951* | (2019.01) |
| *G06F 16/9535* | (2019.01) |

(52) U.S. Cl.
CPC ........ *G06F 21/6254* (2013.01); *G06F 16/951* (2019.01); *G06F 16/9535* (2019.01); *G06Q 30/0256* (2013.01)

(58) Field of Classification Search
CPC ............. G06F 21/6254; G06F 16/9535; G06F 16/951; G06Q 30/0256
See application file for complete search history.

(56) References Cited

U.S. PATENT DOCUMENTS

| | | | | |
|---|---|---|---|---|
| 6,594,662 | B1* | 7/2003 | Sieffert | ................ G06Q 30/02 |
| 2002/0038431 | A1* | 3/2002 | Chesko | .................. H04L 63/04 |
| | | | | 726/26 |
| 2014/0143882 | A1* | 5/2014 | Saniee | ............... G06F 21/6263 |
| | | | | 726/26 |
| 2016/0330237 | A1* | 11/2016 | Edlabadkar | ......... H04L 63/0281 |
| 2019/0130023 | A1* | 5/2019 | Kataria | .............. G06F 16/3326 |

* cited by examiner

*Primary Examiner* — Kevin Bechtel
*Assistant Examiner* — Han Yang

(57) ABSTRACT

An internet profile dilution device and method are provided. To prevent the sale of individual user's internet searches to advertisers, an internet profile dilution software is configured to significantly dilute the individual search and browsing by opening a site the individual has selected, or in the default state, will automatically select from a variety of news outlet websites for dilution of the individual's internet profile. The internet profile dilution software will scan the site, for links to another article, and will navigate to that article and spend a random amount of time appearing to read the article. The software will search for particular words from the title of the article to continue to further dilute the internet profile of the individual. The individual's internet search is sufficiently diluted by the internet profile dilution software so that an accurate profile of the individual's internet search and browsing cannot be established.

11 Claims, 5 Drawing Sheets

INTERNET PROFILE DILUTION DEVICE (IPDD)

CROSS-REFERENCE TO RELATED APPLICATIONS

None

FEDERALLY SPONSORED RESEARCH

None

BACKGROUND

Field of the Invention

The invention relates to the general field of providing Internet anonymization; and specifically relates to an Internet Profile Dilution Device (IPDD).

Description of the Related Art

Certain companies have been commonly known to build profiles from individual's internet searching and browsing habits. These profiles and data are sold to the highest bidder, exposing you to highly targeted advertising and offers you will find it difficult to say no to. It is common for individuals to be on web sites and have the website information surrounded by advertisements and images of items that are similar to items they have recently purchased, targeted advertising. With the help of modern-day machine learning and big-data analysis, these systems could be used to obscure or limit selection from you, as well as to influence your decision-making process. Today, the steps needed to take for avoiding the collection of this data, or the building of your own unique internet searching and browsing profile, are often too difficult to use.

One might ask whether having a Virtual Private Network (VPN) can protect them from having their internet searching and browsing used to identify their purchasing habits. It is true that a VPN can make it more difficult for a company to build a profile of your internet search habits. As an example, your IP address can be obscured, or your geolocation can be hidden within their network. The companies collecting your internet searching and browsing data can still build profiles from your hardware, device, video resolution, operating system, Central Processing Unit (CPU) or Random-Access Memory (RAM), which browser you're using, from among other data points. Certain VPN services may also collect the searching and browsing data and sell that data to the highest bidder as well. As a result, using a VPN simply adds yet another third-party company who may collect data on your searching and browsing habits.

What about false Identities? Creating or using false identities or fake accounts may protect you from some tracking. However, unless you're changing your hardware device, location, and Internet Service Provider (ISP), each time you create a new fake identity, this method again fails to fully protect you from tracking. In addition, this method of using a false identity is likely against the terms of service of many websites, so you may find some websites will block you from creating additional false profiles of fake identities.

Other options include disabling Third Party cookies or 'In-Private' or 'Incognito' Modes on browsers. Tracking and profiling are still simple, but these methods aren't designed to prevent the profiling company from adding to their databases. As a recent example, one known company was still using location-tracking data for people who had 'opted-out' from their service.

Using Anonymizing Tor (The Onion Routing network) proxies, and the setup requirements to prevent building profiles is too difficult for the layman. As large amounts of the internet is still accessible using insecure or unauthenticated (Hypertext Transfer Protocol [HTTP] vs Hypertext Transfer Protocol [HTTPS]) traffic, Tor still allows some identification, which could result in certain entities still being able to build a unique profile based on your system and searching and browsing habits.

Some patents related to the field of classification and building profiles are as follows:

U.S. Pat. No. 5,933,811, which is directed to a system and method for delivering customized advertisements within interactive communication systems.

U.S. Patent Publication US2016/0217446, which is directed to systems and methods to deliver targeted advertisements to audience.

U.S. Pat. No. 6,055,573, which is directed to communicating with a computer based on an updated purchase behavior classification of a particular consumer.

U.S. Patent Publication US 2001/0049620, which is directed to a privacy-protected targeting system.

U.S. Pat. No. 8,566,164, which is directed to targeted online advertisements based on viewing or interacting with television advertisements.

U.S. Pat. No. 7,853,533, which is directed to a method and system for identifying users and detecting fraud by use of the internet.

Japanese Patent JP2014/528,125, which is directed to protecting privacy or defeating Profiles.

Although there are patents in the general field of this patent application, none of the above-listed patents and publications, alone or in any combination, teach or suggest the claimed invention, as set forth, infra.

SUMMARY OF THE INVENTION

It is an object of the invention to prevent an ISP or website or a third party from being able to develop a profile of an individual based upon searching and browsing habits. This needs to be done to protect the searching and browsing habits of individuals. In addition, an individual should not be paying for internet service and have the company providing the internet service, or other companies create and sell their profile information to advertisers. Nor should consumers be led to particular advertisers who may not have the best product or the best price for a consumer. Nor should consumers be exposed to advertisements that they are not interested in buying. In addition, if a consumer's spouse buys an item such as a dress or shoes online using their spouses' computer, the spouse's computer screen should not thereafter be filled with advertisements for ladies' dresses and shoes. Nor should a situation exist where one spouse views all types of advertisements for items they don't purchase and creates problems with their spouse for their spouses' apparent purchases.

The solution provided by this invention of working within the data collection network that these entities have established provides for the creation of a system of diluting the searching and browsing information so that an internet profile cannot be relied upon. In this application, we use the term "surf engine" to mean searching and browsing the Internet. The reason is that by diluting the searching and browsing data to a very large extent that advertising companies will be unwilling to pay advertising dollars for such heavily diluted profile information. The system of the present invention works because other "privacy" solutions work by attempting to bypass or work outside of the tracker. The solution to the above-identified problems is unique and different from the prior art by working within the data collection network these entities have established.

What the system does is as follows. The Software [Installable Software Application] is installed on all devices where personally identifiable websites are accessed. The software, at random times, will begin opening a site you've selected, or in the default state, will automatically select from a variety of news outlet websites. Once the news site is open, the software then begins scanning the site, for links to another article. It will navigate to that article and spend a random amount of time 'appearing' to read the article. The Software will then open a new tab, and search using a term or subject you've selected, or for a particular word or subject from the title of the previous article. The software will collect data from other websites and browse articles from the 'popular' website rankings or social media feed sites. The software could be customized to build "alternate profiles" as well, where it could follow local sports teams, or particular hobbies, or other interests. For example, the "profile" options could be a doctor, a baseball fan, an art collector, or a person interested in technology, once the end user has selected a particular "alternate profile" the Software searches for that profile's items or terms or news.

The reason the instant invention works so well is that our approach to the problem is unique and will work because we're working within the system that the data collection entities have already established. As they analyze and collect the searching and browsing data gathered from systems running our software, 25% or more of the data will be random requests from our software. This high level of randomness of 25% or more of data will make the individual user's web searching and browsing useless to advertising companies who will see a drop in purchases for their many clients. To reduce the value of individual user's internet searching and browsing data to advertisers, the Internet-Profile Dilution Software is configured to significantly dilute the individual's web usage by opening a site the individual or end user has selected, or in the default state, will automatically select from a variety of news outlet websites for dilution of the individual's searching and browsing data. The Software will scan the site, for links to another article, and will navigate to that article and spend a random amount of time appearing to read the article. The diluter will search for particular words from the title of the article to dilute the internet search of the individual. The Software emulates keystrokes, emulates the user, emulates mouse clicks, site visits, word searches, location, etc.

LIST OF REFERENCE NUMERALS FOUND IN THE DRAWINGS

Figure 1:
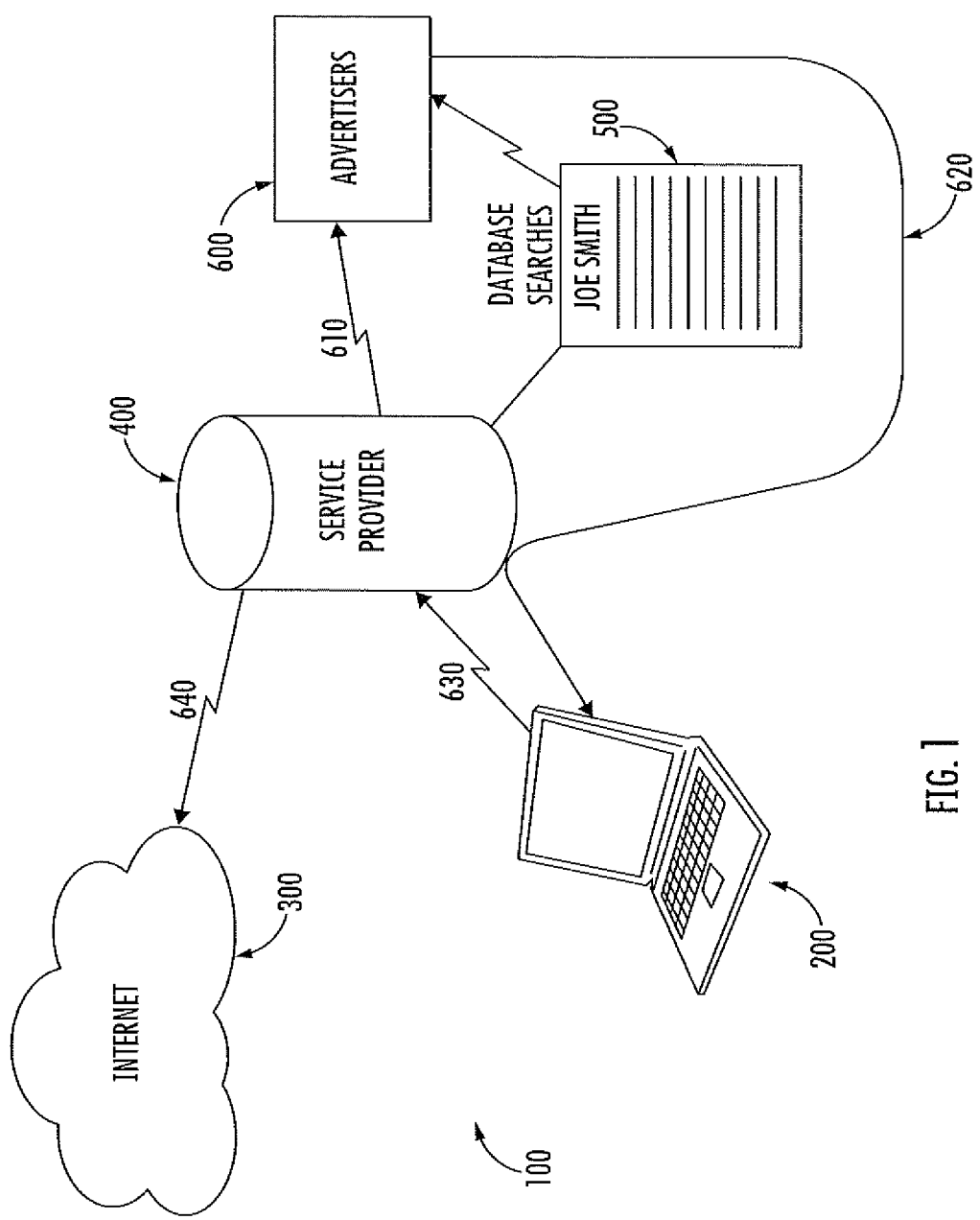
FIG. 1 is directed to the system having an internet profile device.

Element 100 refers to an internet profile dilution device.
Element 200 represents a users' computer, smart phone, etc.
Element 300 represents the internet cloud where the user search profile is stored.
Element 400 represents an internet provider.
Element 500 represents a list of searches from an individual, approximately 128 pages in total.
Element 600 represents the advertisers to whom the internet providers sell an individuals' internet profile.
Element 610 represents a communication link from the internet searches of an individual and the advertisers.
Element 620 represents a communication link from the advertisers and the internet service provider.
Element 630 represents a communication link from the internet service providers to the computer of the individual.
Element 640 represents a link between the internet service providers and the internet cloud.
Element 700 represents the internet profile dilution device which can be hardware or installed software or both.
Element 720 represents a connection to the internet which transmits diluted information so the individual's internet usage cannot be tracked.
Element 730 represents a communication link between the individual's computer and the surfing engine which will create the diluted information.
Element 800 represents the cloud or service where the highly diluted information is created and/or stored.
Element 820 represents a communications link between the individual's computer and the cloud or service.
Element 840 represents a communications link between the cloud or service and the individual's computer.
Element 900 represents the diluted profile, visited sites and the personal profile of the individual,
Element 910 represents the personal profile of the individual.
Element 920 represents the diluted profile.
Element 930 represents internet searched and browsed sites.
Element 940 represents communication links between the diluted profile and the personal profile.
Element 945 represents an individual using the internet dilution system.
Element 950 represents the communication links between the diluted profile and the internet surfing sites.
Element 955 represents a communications link between the individual using the internet dilution system and the internet provider 990.
Element 965 represents a communications link between the internet dilution device 700 and the individual using the internet dilution device.
Element 970 represents a communications link between internet dilution device and the computer 200.
Element 990 represents an internet provider's database containing all of the individual user's searches, where the database is at an internet provider who is profiling the user's internet searches to sell to advertisers.

DETAILED DESCRIPTION OF EXEMPLARY EMBODIMENTS OF THE INVENTION

The claimed invention relates to an internet profile dilution system which is configured such that a website or internet provider cannot distinguish between a user of the claimed systems internet searching and browsing habits, the dilution device or the cloud dilution which emulate the user. The emulation of the user makes it very hard or impossible for a website or internet provider to determine an accurate internet searching and browsing profile of the individual using the internet profile dilution system.

Turning to FIG. 1, this representative figure illustrates an overview of the problem being overcome by the claimed system. In FIG. 1, element 100 represents the overall system. Element 200 represents a computer used by an individual searching and browsing the internet. The internet is illustrated by element 300. An internet service provider who is creating an internet profile of the individual's searching and browsing habits while using the internet is represented by element 400. As shown by element 500 is a collection of approximately 128 pages of data related to the searching and browsing habits collected by the internet provider or other company, on the user, who we will refer to as "Joe Smith." Element 600 represents the advertising company that has purchased the individual's internet search and browsing profile 500 from the internet service provider 400. Element 610 is a communications link at the internet service provider 400 which sends the individual's internet search and browsing profile to the advertising company 600. Element 620 represents advertisements sent from the advertising company 600 to the computer 200 of the user. The communication with the advertisements are sent to the individual's computer 200 via the internet service provider 400. The advertisements are focused to the individual user based on their internet search and browsing profile. The element 700 represents a profiling of an individual's searches is based on the individual having no right to privacy of their searches.

Figure 2:
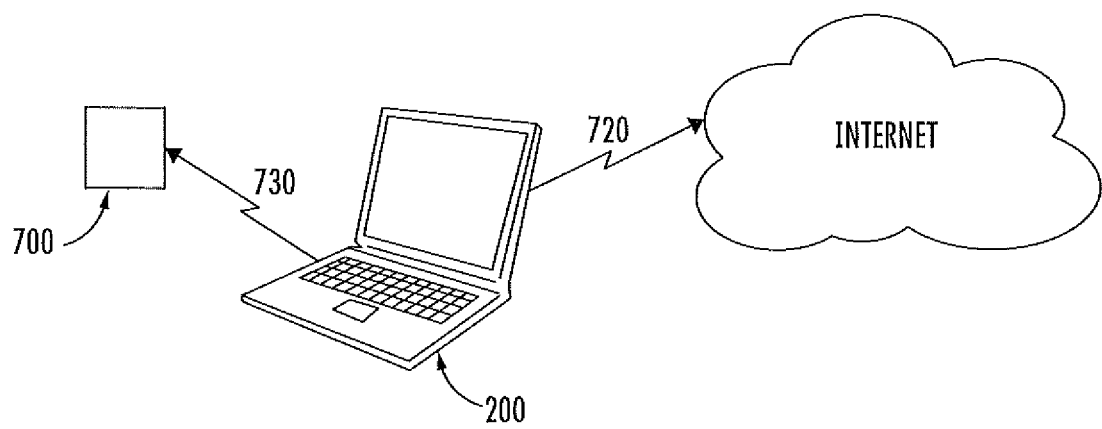
FIG. 2 the device that attaches to an individual user's computer to dilute the ability of a company to create an accurate internet profile to be sold to advertisers.

Turning to FIG. 2, this figure illustrates the dilution device and/or dilution software that dilutes the internet search and browse profile of the individual. As shown in FIG. 2, element 700 represents the internet profile dilution device which is a piece of hardware and/or software which is connected to the individual's computer 200 by way of a wired 730 or a wireless connection with the individual's computer 200. The internet profile dilution device can be modified to dilute based on randomness or by being focused on items such as sports, news, etc. The internet profile dilution device 700 will learn your profile based on speed, data entry, etc., and performs searches that are opposite what you have searched. These opposite searches, etc. become interspaced with the actual searches of the individual. Element 720 represents connection of your internet searches, including the dilated internet searches performed by the internet profile dilution device 700. The result is that the internet provider who is creating the individual's internet profile 500 for sale to advertisers is unable to create a profile that is of any economic value because the profile they create is mostly unrelated to the individual user.

Figure 3:
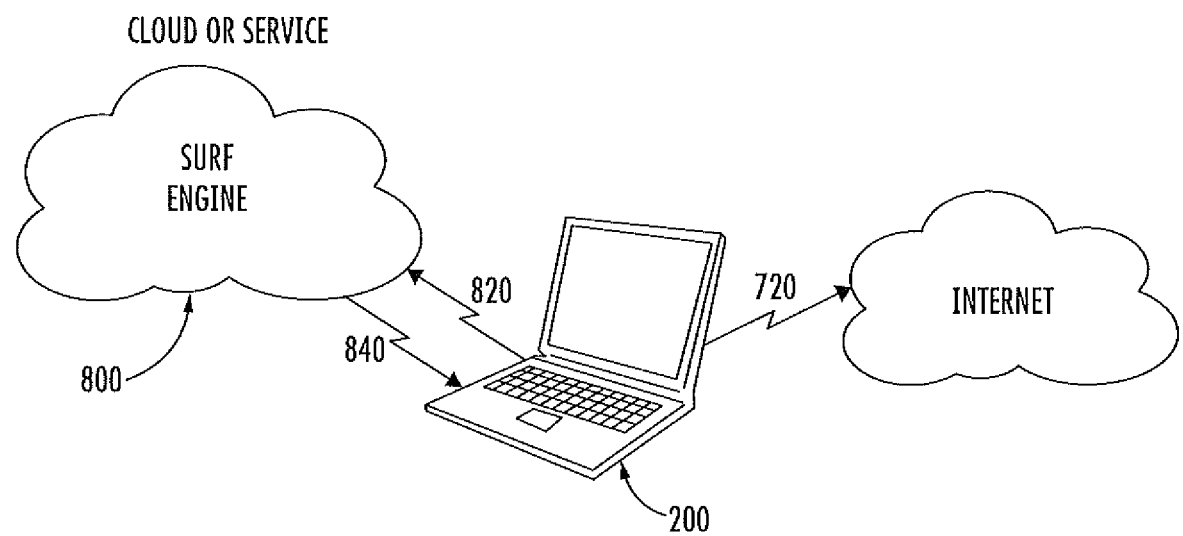
FIG. 3 is directed to the internet profile dilution device and cloud dilution device used to dilute the customer's searches.

Turning to FIG. 3, this figure illustrates an exemplary embodiment where the internet profile dilution device is located in a cloud 800. Element 820 represents a communication link between the individual user's computer 200 to the cloud 800 where the internet profile dilution takes place. From cloud 800, the diluted profile is transmitted to the individual user's computer 710. From the individual computer's computer 200, the diluted internet profile is forwarded to the internet via communication's line where the internet provider uses the individual's internet search and browsing habits to create a user's internet profile which is sold to advertiser or advertisers. In operation, the individual's internet profile is diluted by 25% or more, which makes it very difficult or even impossible for an internet provider or other company to create an accurate profile.

Figure 4:
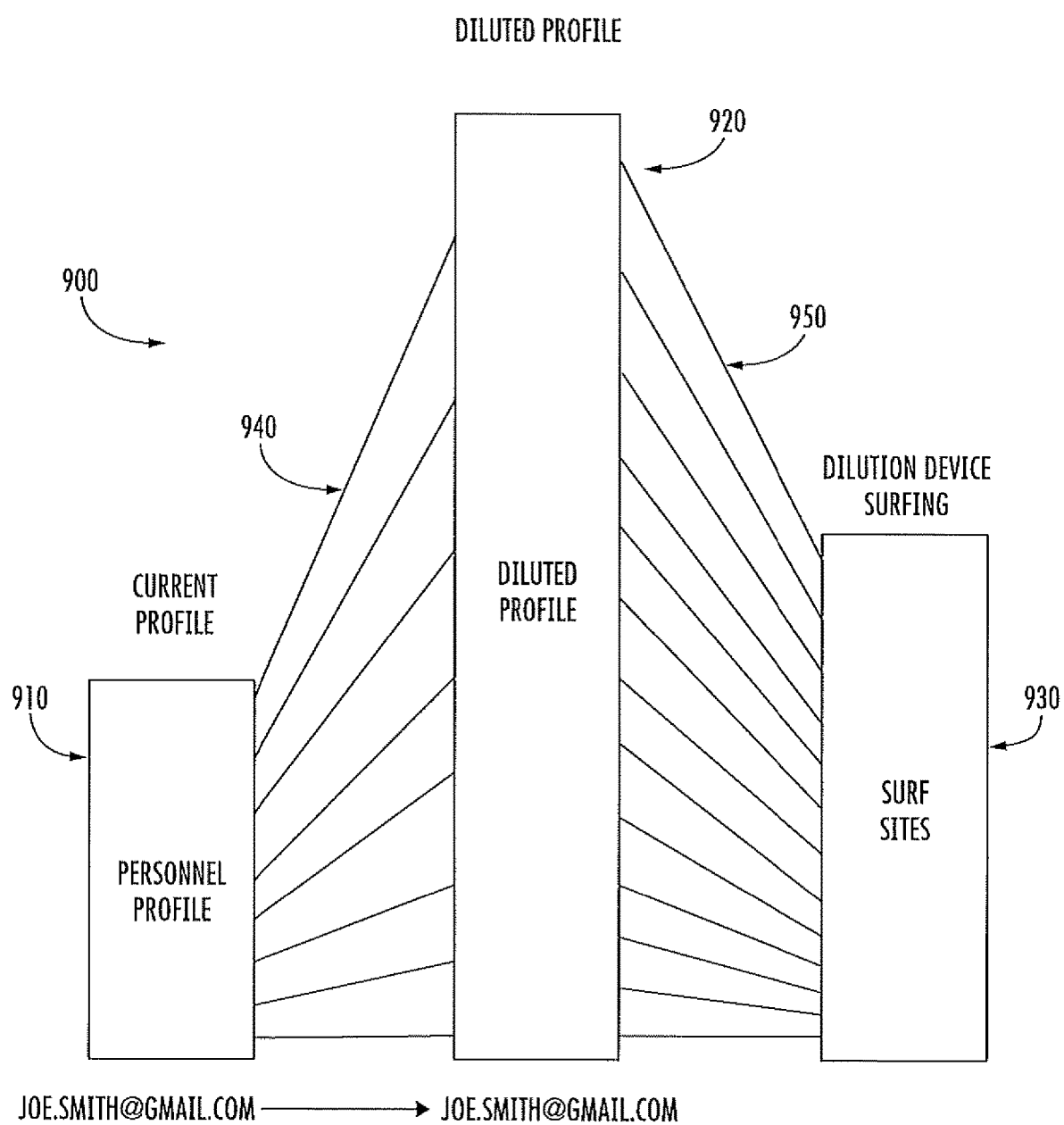
FIG. 4 is directed to a sample dilution profile.

Turning to FIG. 4, this figure illustrates an example of a diluted profile 900 in accordance with an exemplary embodiment of the invention. FIG. 4 illustrates a diluted internet profile for individual "Joe Smith." Element 910 represents the current internet profile of individual user Joe Smith. Element 930 represents the relative size of the diluted profile. The dilution device's search and browsing data is shown by surf sites 930. Element 940 represents communication lines between the personal profile of the individual user Joe Smith. Element 950 represents the communication line between the searched and browsed sites of the dilution device which browses sites not visited by Joe Smith. In operation, the current internet profile 910 of the individual user Joe Smith is diluted by the internet profile dilution device's searched and browsed sites 930. The complete search of the individual user Joe Smith is transmitted to the diluted profile 920 of the diluted profile device and/or software. The solution provided by this invention of working within the data collection network that these entities have established provides for the creation of a system of diluting the search and browsing information so that an internet profile cannot be established. The reason is that by diluting the profile to a very large extent that advertising companies will be unwilling to pay advertising dollars for such heavily diluted profile information. The system of the present invention works because other "privacy" solutions work by attempting to bypass or work outside of the tracker. The solution to the above-identified problems is unique and different from the prior art by working within the data collection network these entities have established.

What the system does is as follows. Software [Installable Software Application (Software)] is installed on all devices where personally identifiable websites are accessed. The software, at random times, will begin opening a site you've selected, or in the default state, will automatically select from a variety of news outlet websites. Once the news site is open, the software will then begin scanning the site, for links to another article. It will navigate to that article and spend a random amount of time 'appearing' to read the article. It will then open a new tab, and search using a web browser you've selected, or the default browser search engine for the browser, for particular words from the title of the article. The software will collect data from other websites and open and browse articles from the 'popular' website rankings or social media feed sites.

The software could be customized to build "profiles" as well where it could follow local sports teams, or particular hobbies, or other interest s. For example, the "profile" options could be a doctor, a baseball fan, an art collector, or a person interested in technology, once the end user has selected a "'profile" which searches for particular, items or terms or news. The search performed by the dilution device, may be the opposite of what the individual internet searcher was searching for.

The reason the instant invention works so well is that our approach to the problem is unique and will work because the claimed invention is working within the system that the data collection entities have already established. As they analyze and collect the data gathered systems running our software, 25% or more of the data will be random requests from Applicant's service. This high level of randomness of 25% or more of data will make their profile useless to advertising companies who will see a drop in purchases for their many clients.

Figure 5:
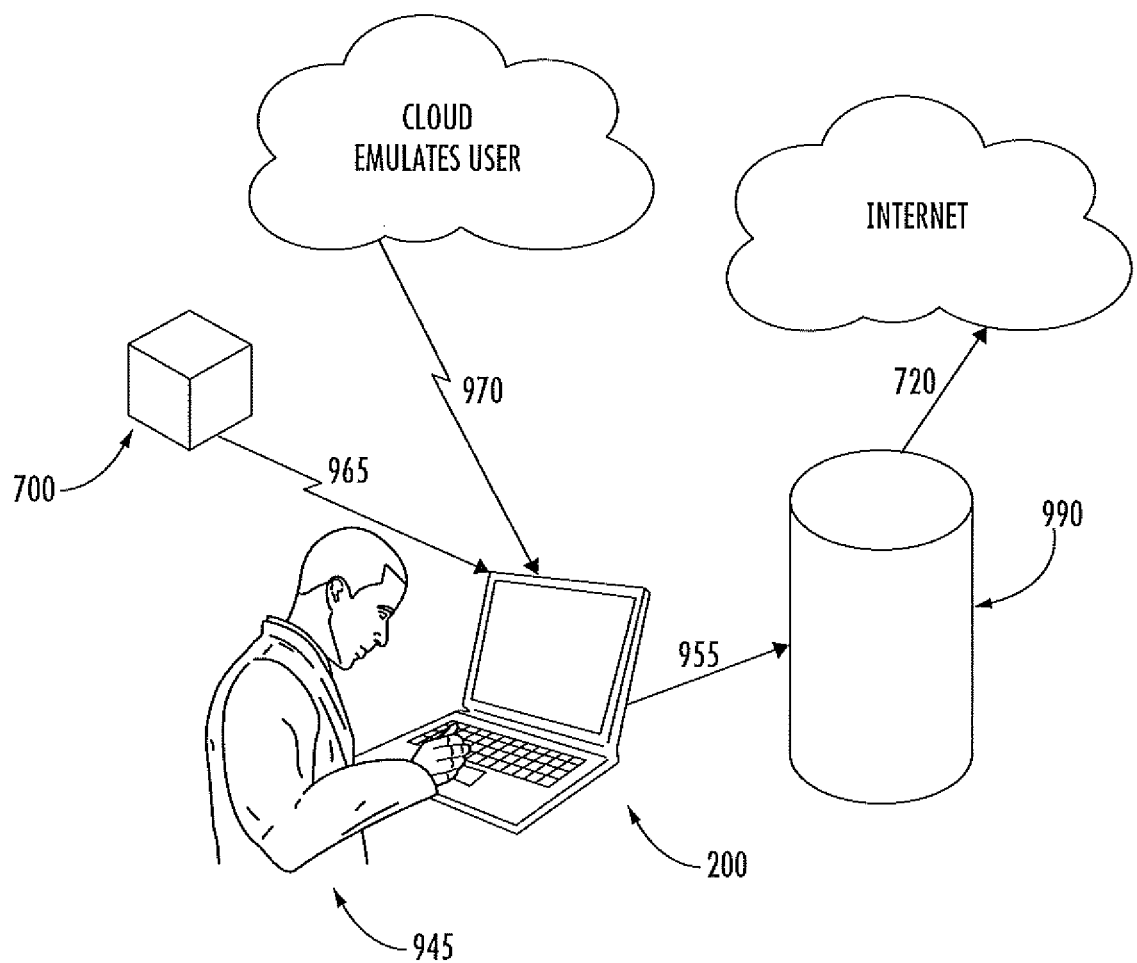
FIG. 5 Is directed to condition the internet traffic to make it very hard to identify the user device or process, such that the internet provider cannot distinguish between your searches and the internet profile dilution device or the cloud dilution device.

Turning to FIG. 5, this figure relates to conditioning internet traffic to make it difficult for an internet provider to identity the device or IP address the diluted information is coming from. Element 945 represents an individual user typing an internet search on a keyboard of a computer 200. At cloud 800, the individual user's internet search is emulated and greatly diluted. The diluted search is then transmitted through communication line 970 to the individual user's computer 200 and from computer 200 to an internet provider database 990 containing the individual user's internet searches, about 128 pages, of internet searches at the internet provider's search engine 990. From the internet provider database 990, the profile is sent to advertisers 980 within the internet 720. As illustrated in FIG. 5, communications link 955 communicates between computer 200 and internet provider 990.

From all of the above, the dilution system is configured such that an internet provider cannot distinguish between an individual internet searcher's searches, the internet profile dilution device or cloud the individual is using or the cloud dilution device.

Although exemplary embodiments of the invention have been shown and described, these are merely examples and other embodiments would be readily known to one of ordinary skill in the art. The invention should not be considered to be limited by the exemplary embodiments but rather by the appended claims.

What is claimed is:

1. An internet profile dilution system; the internet profile dilution system comprising:
   a computer having an input device selected from but not limited to: a keyboard, microphone or touchscreen;
   the computer including the input device connected to the internet through an internet service provider;
   the Internet service provider including communications link to the internet for an individual user of the computer;
   the internet service provider having one or more databases having a list of browsing and searches made by the individual user of the computer;
   the internet service provider database of the individual user searching and browsing being in communication with a processor which creates an internet search and browsing profile of the individual user's search on the computer;
   the internet service provider selling the internet search and browsing profile to one or more advertisers, the advertiser sending focused advertisements to the individual user of the computer;
   an internet profile dilution software is configured to dilute the individual user's search, wherein the individual user's internet profile is diluted by the internet profile dilution software such that an accurate profile of the individual user's internet search cannot be established;
   wherein the internet profile dilution software, in a default state, will automatically select from a variety of news outlet websites for dilution of the individual user's internet searches, wherein once the news outlet website is open, the internet profile dilution software will scan the site, for links to another article, and will navigate to that article and spend a random amount of time appearing to read the article;
   wherein the internet profile dilution software, at random times, will open a site the individual user has searched, wherein the internet profile dilution software will then open a new tab, and search using a web browser the individual user has selected, and the selected browser search engine will search for particular words from a title of the article to dilute the internet search of the individual user.

2. The internet profile dilution system of claim 1, wherein the diluted internet search is stored in a cloud.

3. The internet profile dilution system of claim 1, wherein the internet profile dilution software will browse articles from popular website rankings or social media feed sites.

4. The internet profile dilution system of claim 3, wherein the internet profile dilution software is configured to build profiles as well, where it could follow local sports teams, or particular hobbies, or other Interests of the Individual user.

5. The internet profile dilution system of claim 4, wherein profile options include but not limited to: a doctor, a baseball fan, an art collector, or a person interested in technology, once the user has selected a profile which searches for particular items or terms or news.

6. The internet profile dilution system of claim 1, wherein the internet profile dilution software is configured to work within the internet provider's system of data collection.

7. An internet profile dilution system; the internet profile dilution system comprising:
   a computer having an input device selected from but not limited to: a keyboard, touchscreen or microphone;
   the computer being connected to the internet through an internet service provider;
   the internet service provider including communications link to the internet for the individual user of the computer;
   the internet service provider having one or more databases having a list of searches made by the individual user of the computer;
   the Internet provider database of Individual user searches and browsing being in communication with a processor which creates an internet profile of the individual user searching on the computer;
   the internet service provider selling the internet profile to one or more advertisers, the advertiser sending focused advertisements to the individual user of the computer;
   an internet profile dilution software configured to dilute the individual's search,
   wherein the individual's internet search is diluted by the internet profile dilution software such that an accurate profile of the individual's internet search cannot be established; and
   the internet profile dilution software is configured as a surf engine in communication with the computer;
   wherein the internet profile dilution software, in a default state, will automatically select from a variety of news outlet websites for dilution of the individual user's internet searches, wherein once the news outlet website is open, the internet profile dilution software will scan the site, for links to another article, and will navigate to that article and spend a random amount of time appearing to read the article;
   wherein the internet profile dilution software, at random times, will open a site the individual user has searched, wherein the internet profile dilution software will then open a new tab, and search using a web browser the individual user has selected, and the selected browser search engine will search for particular words from a title of the article to dilute the internet search of the individual user.

8. A method of diluting an internet search; the internet search dilution method comprising the steps of:
   providing a computer having an input device such as but not limited to a keyboard, microphone and touchscreen;
   the computer being connected to the Internet through an Internet service provider;
   wherein the internet service provider including communications link to the internet for the individual user of the computer;
   the internet service provider having one or more databases having a list of searches made by the individual user of the computer;
   wherein the internet provider database of individual user searches being in communication with a processor which creates an internet search profile of the individual user's search on the computer;
   the internet service provider selling the internet search profile to one or more advertisers and the advertiser or advertisers sending focused advertisements to the individual user of the computer; and
   configuring an Internet search dilution agent which dilutes the individual's search, wherein the individual user's internet search is diluted by internet profile dilution software such that an accurate profile of the individual user's internet search cannot be established;
   wherein the internet profile dilution software, in a default state, will automatically select from a variety of news outlet websites for dilution of the individual user's internet searches, wherein once the news outlet website is open, the internet profile dilution software will scan the site, for links to another article, and will navigate to that article and spend a random amount of time appearing to read the article;
   wherein the internet profile dilution software, at random times, will open a site the individual user has searched, wherein the internet profile dilution software will then open a new tab, and search using a web browser the individual user has selected, and the selected browser search engine will search for particular words from a title of the article to dilute the internet search of the individual user.

9. The method of claim 8, wherein the internet profile dilution software will browse articles from popular website rankings or social media feed sites and is configured to build profiles as well, where it could follow local sports teams, or particular hobbies, or other interests of the individual user.

10. The method of claim 9, wherein profile options include a doctor, a baseball fan, an art collector, or a person interested in technology, once the user has selected a profile which searches for particular items or terms or news.

11. The method of claim 10, wherein the internet profile dilution software is configured to work within the internet provider's system of data collection.

* * * * *